Patented Jan. 20, 1953

2,626,218

UNITED STATES PATENT OFFICE 2,626,218

LIQUID PEPPER COMPOSITION AND PROCESS OF PRODUCING THE SAME

Claude Johnstone, Brooklyn, N. Y., and Frederick R. Schumm, Jersey City, N. J., assignors to Dodge & Olcott, Inc., New York, N. Y., a corporation of Delaware No Drawing. Application November 1, 1950, Serial No. 193,536

11 Claims. (Cl. 99—140)

The present invention relates to solubilized pepper compositions derived from the oleoresins of members of the Piperaceae family. It provides homogeneous, liquid, piperin compositions especially useful for seasoning purposes and also provides an improved method by which these compositions may advantageously be prepared.

Oleoresins derived from the plant, *Piper nigrum* L., i. e., black pepper, and from other members of the Piperaceae family, contain a considerable amount of piperin, an ingredient responsible for much of the bite and pungency characteristics of pepper and of the oleoresins made from plants of this family. However, commercial oleoresins of this type are non-homogeneous products, consisting primarily of essential and fixed oils as a liquid phase, and a solid phase consisting essentially of piperin.

The fixed oils present in these oleoresins are easily oxidized by exposure to the air and such oxidation deleteriously affects the odor of the oleoresin. Further, the relative insolubility of the piperin results in a slow taste-perception of its pepper-like qualities.

The primary commercial use of the oleoresins of pepper is in the manufacture of food seasoning compositions. However, for this purpose, their non-homogeneity and lack of stability have been found objectionable and have mitigated against their use, as such, and the ready, economical production therefrom of a uniform, stable seasoning composition.

Our present invention provides homogeneous, liquid pepper compositions derived from the oleoresins of pepper and containing maximum amounts of readily available seasoning substances. In accordance with a presently preferred modification of the invention, our improved pepper compositions are prepared free from the readily oxidized fixed oils normally present in the oleoresins and are exceptionably stable with respect to oxidation and development of off-odors. Where desired, these novel pepper compositions may be used as such, or may be further processed to stable, uniform seasoning compositions in powder form.

These improved pepper compositions may be prepared from commercial oleoresins of pepper of conventional type, or the oleoresins may be extracted from pepper corns, for instance, in accordance with conventional procedure, as a preliminary step of our process.

In accordance with our present invention, the homogeneous liquid compositions containing the pepper constituent of the oleoresins in solution are prepared by the mixing of certain substantially anhydrous organic acids with conventional oleoresins of pepper.

For this purpose, we have, with particular advantage, used levulinic acid. However, in place thereof, we may use acetic acid, butyric acid, or pyruvic acid. While we have found the use of one of the acids, just mentioned, to be particularly advantageous for our present purpose, it may, for some purposes, be found desirable to use other acids. Other similar, normally liquid, organic acids, which are soluble in, or substantially miscible with, the essential oils of the oleoresins, may be used effectively to form homogeneous mixtures of the oleoresins. It is essential, however, that the acid used be anhydrous, or substantially so, as otherwise homogeneous liquid compositions do not result.

Where contemplated conditions of handling or use of the resultant homogeneous pepper compositions are such that oxidation of the fixed oil constituent thereof might result, it is desirable to remove the easily oxidized fixed oils from the pepper composition. This may be effected, in accordance with out present invention, by adding 95% ethyl alcohol to the oleoresin-acid mixture, the addition of the alcohol resulting in the separation of the mixture into an upper layer containing the easily oxidized fixed oils and a lower layer containing the flavoring principles of the pepper in stable homogeneous liquid form.

For the purposes of our invention, the oleoresins of pepper may, as previously indicated, be prepared by conventional procedure. Such procedure usually consists in the extraction of dried ground pepper corns by a volatile solvent, such as, ether, alcohol, or acetone. Following the extraction, the solvent is usually removed by distillation at moderate temperatures, the resultant residue constituting the oleoresin of the pepper. This product, as previously stated, is composed of a solid phase, consisting of piperin and natural resins, and a liquid phase consisting of fixed and essential oils. Upon standing, the solid phase forms a hard, crystalline mass which frequently must be heated to its softening point before ready removal from its container is possible. Such heating must be carefully controlled, as any overheating deleteriously affects the odor of the pepper composition.

The invention will be more particularly described and illustrated by the following specific example of its application to black pepper compositions. It will be understood that the invention is similarly applicable to other members of the Piperaceae family.

Four thousand pounds of black pepper corns were dried, ground to 20 mesh size, and extracted with acetone, in the conventional type of continuous extraction apparatus, until the extraction of the oleoresins was complete. The resultant extract was then distilled at atmospheric pressure to remove the major portion of the solvent, the distillation being continued until the residual liquid reached a temperature of about 135° F. The residual liquid was then cooled to about room temperature and 200 pounds of levulinic acid was added thereto. The distilling vessel was then closed and the distillation continued with agitation, at an absolute pressure of about 1 pound per square inch, until the last of the solvent was distilled off. In this distilling operation, the temperature of the liquid was not permitted to exceed 100° F.

The resultant homogeneous oleoresin mixture was then removed to a separate vessel and allowed to cool to room temperature. Thereafter, 90 pounds of 95% ethyl alcohol was added with agitation to effect thorough mixing. The mixture was then permitted to stand for approximately 24 hours, and there was formed an upper layer of liquid containing the easily oxidized fixed oils. This layer, amounting to 60 pounds, was removed and discarded. The lower layer was a homogeneous liquid consisting essentially of the piperin, natural resins, and essential oils of the pepper, along with the levulinic acid and alcohol, and was found to be stable against deteriorating oxidation and to be useful either as such or in the preparation of seasoning compositions.

In the foregoing example, the levulinic acid was added to the oleoresin while the latter still contained a small amount of the extractive solvent. We have found that the presence of a small amount of the solvent is advantageous with respect to the ease of solution and mixing and generally obviates the necessity of heating the mixture of the oleoresin and acid to expedite the solution of the solid phase. It will be understood, however, that the presence of the solvent is not essential to our present process. Where desired, ordinary oleoresins of commerce, free from extractive solvents, may be used as the starting material.

The separation of the easily oxidized fixed oils from the pepper composition is promoted, as previously noted, by the addition of the alcohol. Where the separation of these fixed oils is desirable, the addition of the alcohol is highly effective. However, the separation of the fixed oils is not necessary in order to produce homogeneous liquid pepper compositions contemplated by our present invention in its broader aspect. Even if the separation step be omitted, an improved homogeneous liquid composition, free from solidified piperin, will result.

The proportion of the organic acid to oleoresin may be varied within the range of about 1 part to about 3 parts of acid for each 3 parts of oleoresin, by weight. The use of about 1 part of acid for each 2 parts of oleoresin has been found to give generally satisfactory results. We have found, however, that where less than about 1 part of acid for each 3 parts of oleoresin is used, the piperin is likely to be precipitated from solution if subjected to low temperatures, such as frequently encountered in winter weather. We have further found that, while in excess of 1 part of acid per part of oleoresin may be used effectively, no additional advantage is usually gained by doing so and greater proportions of acid are not generally desirable since they serve to dilute the flavoring principles of the mixture.

The proportion of alcohol added to effect the separation of the fixed oils is also subject to some variation. Generally we have found that less than 1 part of 95% ethyl alcohol to 9 parts of the oleoresin-acid mixture, i. e., less than 10% of the total weight of the resultant alcohol-oleoresin-acid mixture, is insufficient to give a complete separation of the readily oxidized fixed oils. Proportions of about 1 part of 95% ethyl alcohol for each 9 parts of the oleoresin-acid mixture have been found advantageous. Proportions of alcohol as great as 3 parts for each 7 parts of the oleoresin-acid mixture, i. e., 30% by weight, have also been used with advantage. However, particularly good results have been obtained where about 1½ parts of alcohol to 8½ parts of oleoresin-acid mixture, i. e., 15% by weight, are used.

The alcohol used for this purpose should be substantially anhydrous, e. g., 95% ethyl alcohol, since the presence of water in the mixture is objectionable.

Some benefits may be derived from the use of proportions of alcohol without the above-stated range, where stability requirements are less stringent. Likewise, the use of proportions of the organic acids without the indicated range, but effective to promote homogeneity of the oleoresins, is contemplated by the broader aspect of this invention.

We claim:

1. The process for producing homogeneous liquid pepper compositions which comprises adding to, and mixing with, an oleoresin of pepper, a substantially anhydrous, normally liquid organic acid which is substantially miscible with the essential oils of the oleoresin.

2. The process for producing homogeneous liquid pepper compositions which comprises adding to, and mixing with, an oleoresin of pepper, a substantially anhydrous organic acid of the group consisting of levulinic acid, acetic acid, butyric acid and pyruvic acid.

3. The process for producing homogeneous liquid pepper compositions which comprises adding to, and mixing with, an oleoresin of pepper, a substantially anhydrous organic acid of the group consisting of levulinic acid, acetic acid, butyric acid and pyruvic acid, in proportions within the range of 1 to 3 parts of the acid for each three parts of the oleoresin, by weight.

4. The process for producing homogeneous liquid pepper compositions which comprises adding to, and mixing with, an oleoresin of pepper containing readily oxidizable fixed oils normally present therein, a substantially anhydrous, normally liquid organic acid which is substantially miscible with the essential oils of the oleoresin, adding to the resultant mixture a quantity of substantially anhydrous ethyl alcohol effective to promote the separation of the mixture into an upper layer, containing the readily oxidizable fixed oils, and a lower layer, containing the flavoring principles of the pepper and separating the upper layer from the lower layer.

5. The process of claim 4 in which the proportion of alcohol added is within the range of 10% to 30% of the resultant mixture, by weight.

6. The process of claim 5 in which the amount of alcohol added is about 15% of the total mixture, by weight.

7. The process for producing homogeneous liquid pepper compositions which comprises adding to, and mixing with, an oleoresin of pepper, in the presence of a relatively small proportion of an organic solvent therefor, a substantially anhydrous normally liquid organic acid which is substantially miscible with the essential oils of the oleoresin and separating the organic solvent from the resultant mixture.

8. The process of claim 1 in which the organic acid is levulinic acid.

9. A homogeneous liquid pepper composition comprising an oleoresin of pepper and a substantially anhydrous, normally liquid organic acid which is substantially miscible with the essential oils of the oleoresin.

10. A stable homogeneous liquid pepper composition comprising an oleoresin of pepper and a substantially anhydrous, normally liquid organic acid, which is substantially miscible with the essential oils of the oleoresin, said composition being substantially free from readily oxidizable fixed oils.

11. The product of claim 9 in the preparation of which the organic acid is levulinic acid.

CLAUDE JOHNSTONE.
FREDERICK R. SCHUMM.

REFERENCES CITED

The following references are of record in the file of this patent:

UNITED STATES PATENTS

| Number | Name | Date |
|---|---|---|
| 1,602,183 | Thomssen | Oct. 5, 1926 |
| 2,079,415 | Levinson | May 4, 1937 |
| 2,527,785 | Armstrong | Oct. 31, 1950 |

OTHER REFERENCES

"The Chemical Senses," by Moncrieff, Leonard Hill Ltd., 17 Stratford Place, W. 1, London, 1944, pages 97 and 99.